(12) United States Patent
Kolb et al.

(10) Patent No.: US 7,669,118 B2
(45) Date of Patent: Feb. 23, 2010

(54) METHOD, SYSTEM AND PROGRAM FOR PROVIDING PAGE WITH PLURALITY OF CODE PORTIONS IN BROWSER MARKUP LANGUAGE

(75) Inventors: Martin Kolb, Waghäusel (DE); Lorenz Wiest, Walldorf (DE)

(73) Assignee: SAP AG, Walldorf (DE)

( * ) Notice: Subject to any disclaimer, the term of this patent is extended or adjusted under 35 U.S.C. 154(b) by 1231 days.

(21) Appl. No.: 10/337,230

(22) Filed: Jan. 6, 2003

(65) Prior Publication Data

US 2004/0133852 A1    Jul. 8, 2004

(51) Int. Cl.
*G06F 17/00* (2006.01)
(52) U.S. Cl. ........................ 715/234; 715/227
(58) Field of Classification Search ................. 715/513, 715/509, 227, 234
See application file for complete search history.

(56) References Cited

U.S. PATENT DOCUMENTS

| | | | |
|---|---|---|---|
| 5,544,301 A | | 8/1996 | Orton et al. |
| 6,263,352 B1 | | 7/2001 | Cohen |
| 6,336,124 B1 | * | 1/2002 | Alam et al. ................. 715/523 |
| 6,718,515 B1 | * | 4/2004 | Conner et al. ............... 715/509 |
| 6,799,182 B2 | * | 9/2004 | Bata ........................... 707/101 |

FOREIGN PATENT DOCUMENTS

WO    WO 03/005231 A2    1/2003

OTHER PUBLICATIONS

"Cascading Style Sheets, level 1," W3C Recommendation, Dec. 17, 1996, revised Jan. 11, 1999, pp. 1-70, retrieved from <http://www.w3.org/TR/1999/REC-CSS1-19990111> on Jan. 20, 2003.
"Cascading Style Sheets, level 2, CSS2 Specification," W3C Recommendation, May 12, 1998, Abstract & Table of Contents, pp. 1-11, retrieved from <http://www.w3.org/TR/REC-CSS2/> on Jan. 20, 2003.

(Continued)

*Primary Examiner*—Amelia Rutledge
(74) *Attorney, Agent, or Firm*—Finnegan, Henderson, Farabow, Garrett & Dunner, LLP

(57) ABSTRACT

Methods, systems and programs are disclosed for providing a page with a plurality of code portions. In accordance with one embodiment, a computer system is provided that includes a browser client and a page-generator server. The page-generator may provide an HTML-page with a plurality of Y-code portions in HTML by using a page description with X-code portions in XML. The generator may read a set of first data items from an interface and read the description that defines a table structure, references to the first data items, a set of second data items, and a presentation direction by which the first and second data items are to be consecutively presented by the browser. Further, the generator may provide the Y-code portions for the page by writing corresponding structure code to the page according to the table structure, by writing data code (a) corresponding to the first data items resolved from the references and (b) corresponding to the second data items, and by writing presentation direction code. Presentation directions may include horizontal and vertical presentation directions.

12 Claims, 14 Drawing Sheets

| AUTHOR | TITLE | PRICE | IMAGE | COMMENT |
|---|---|---|---|---|
| A. A. Alp<br>ALPHA<br>€ 100 | ALPHA | 100 | α | FIRST |
| B. B. Bet<br>BETA<br>€ 200 | BETA | 200 | β | SECOND |
| G. G. Gam<br>GAMMA<br>€ 300 | GAMMA | 300 | γ | THIRD |

PRESENTATION    260

OTHER PUBLICATIONS

A. Kristensen, "Template Resolution in XML/HTML," Computer Networks and ISDN Systems, North Holland Publishing, Amsterdam, NL, vol. 30, No. 1-7, Apr. 1, 1998, pp. 239-249.

F. Chahuneau et al., "SGML Template Driven Database Extraction: A New Approach to Report Generation," Proceedings of SGML '97, 'Online! Jul. 21, 1998, pp. 1-7, retrieved from <www.oasis-open.org/cover/chahuneauSGML96.html> on Dec. 6, 1999.

K. E. Shafer, "Mantis Project: A Toolkit for Cataloging," Annual Review of OCLC Research, 'Online! 1998, pp. 1-4, retrieved from <http://www.oclc.org/research/publications/arr/1998/shafer/mantis.htm> on Jul. 23, 2002.

H. Willumeit et al., U.S. Appl. No. 10/275,395, filed Nov. 5, 2002, entitled "Defining Layout Files By Markup Language Documents."

* cited by examiner

| DATA ITEMS 215 (FIRST PLURALITY) | DATA FIELDS 216 |
|---|---|
| A.A. Alp<br>B. B. Bet<br>G. G. Gam | AUTHOR_field |
| ALPHA<br>BETA<br>GAMMA | TITLE_field |
| 100<br>200<br>300 | PRICE_field |
| α<br>β<br>γ | IMAGE_field |
| FIRST<br>SECOND<br>THIRD | COMMENT_field |
| DATA INTERFACE | 210 |

FIG. 6

```
X
01  <TABLE data="...">
02    <ROWPATTERN>
03      <FLOWLAYOUT direction="H">
04        <FIELDREF field="IMAGE_field" />
05        <FLOWLAYOUT Direction="V">
06          <FIELDREF field ="AUTHOR_field" />
07          <FIELDREF field="TITLE_field" />
08          <FLOWLAYOUT direction="H">
09            <TEXT text="€" />
10            <FIELDREF field ="PRICE_field" />
11          </FLOWLAYOUT>
12          <FIELDREF field = "COMMENT_field" />
13        </FLOWLAYOUT>
14      </FLOWLAYOUT>
15    </ROWPATTERN>
16  </TABLE>
```

DESCRIPTION  220

FIG. 7

| Y | |
|---|---|
| 01 | <table ... > |
| 02 | <tr> |
| 03 | <td>    image         </td> |
| 04 | <td>    A. A. Alp    <p> |
| 05 |         ALPHA          <p> |
| 06 |         €100           <p> |
| 07 |         FIRST          </td> |
| 08 | </tr> |
| 09 | <tr> |
| 10 | <td>    image         </td> |
| 11 | <td>    B. B. Bet    <p> |
| 12 |         BETA           <p> |
| 13 |         €200           <P> |
| 14 |         SECOND         </td> |
| 15 | </tr> |
| 16 | <tr> |
| 17 | <td>    image         </td> |
| 18 | <td>    G. G. Gam    <p> |
| 19 |         GAMMA          <p> |
| 20 |         €300           <p> |
| 21 |          THIRD         </td> |
| 22 | </tr> |
| 23 | </table> |

PAGE                240

FIG. 8

| α | (Y04) | A. A. Alp (X06) |
| | | ALPHA (X07) |
| | | € 100 (X09)(X10) |
| | | FIRST (X12) |
| β | (X04') | B. B. Bet (X06') |
| | | BETA (X07') |
| | | € 200 (Y09')(Y10') |
| | | SECOND (X12') |
| γ | (X04") | G. G. Gam (X06") |
| | | GAMMA (X07") |
| | | € 300 (X09")(X10") |
| | | THIRD (X12") |

PRESENTATION  260

FIG. 9

```
X
01  <TABLE ... >
02     <COLUMN name="AUTHOR">
03        <COLUMNPATTERN>
04           <FLOWLAYOUT direction="V">
05              <FIELDREF field ="AUTHOR_field" />
06              <FIELDREF field ="TITLE_field" />
07              <FLOWLAYOUT direction="H">
08                 <TEXT text="€" />
09                 <FIELDREF field = "PRICE_field" />
10              </FLOWLAYOUT>
11           </FLOWLAYOUT>
12        </COLUMNPATTERN>
13     </COLUMN>
14     <FIELDREF field = "TITLE_field" visible = "false">
15     <FIELDREF field = "PRICE_field" visible = "false">
15  </TABLE>
```

DESCRIPTION       220

FIG. 10

| Y | |
|---|---|
| 01 | `<table>` |
| 02 | `<tr>` |
| 03 | `<td>A.A.Alp  <p> ALPHA  <p> €100  </td>` |
| 04 | `<td>ALPHA  </td>` |
| 05 | `<td>100 </td>` |
| 06 | `<td>image </td>` |
| 07 | `<td>FIRST </td>` |
| 08 | `</tr>` |
| 09 | `<tr>` |
| 10 | `<td>B.B.Bet  <p> BETA  <p> €200  </td>` |
| 11 | `<td>BETA  </td>` |
| 12 | `<td>200 </td>` |
| 13 | `<td>image </td>` |
| 14 | `<td>SECOND  </td>` |
| 15 | `</tr>` |
| 16 | `<tr>` |
| 17 | `<td>G.G.GAM  <p> GAMMA <p> €300  </td>` |
| 18 | `<td>GAMMA </td>` |
| 19 | `<td>300 </td>` |
| 20 | `<td>image </td>` |
| 21 | `<td>THIRD  </td>` |
| 22 | `</tr>` |
| 23 | `</table>` |

PAGE        <u>240</u>

FIG. 11

| AUTHOR | TITLE | PRICE | IMAGE | COMMENT |
|---|---|---|---|---|
| A. A. Alp<br>ALPHA<br>€ 100 | ALPHA | 100 | α | FIRST |
| B. B. Bet<br>BETA<br>€ 200 | BETA | 200 | β | SECOND |
| G. G. Gam<br>GAMMA<br>€ 300 | GAMMA | 300 | γ | THIRD |

PRESENTATION    260

FIG. 12

```
X
01  <TABLE data="...">
02  <CELL field ="AUTHOR" row="2">
03     <CELLPATTERN>
04        <FLOWLAYOUT direction="V">
05           <FIELDREF field ="AUTHOR_field" />
06           <FIELDREF field ="TITLE_field" />
07            <FLOWLAYOUT direction="H">
08               <TEXT text="€">
09            <FIELDREF field ="PRICE_field" />
10            </FLOWLAYOUT>
11        </FLOWLAYOUT>
12     </CELLPATTERN>
13  </CELL>
14  <COLUMN name="TITLE" visible="false" />
15  <COLUMN name="PRICE" visible="false" />
16  </TABLE>
```

DESCRIPTION        220

FIG. 13

| Y | |
|---|---|
| 1 | `<table >` |
| 2 | `  <tr>` |
| 3 | `    <th>AUTHOR  </th>` |
| 4 | `    <th>IMAGE  </th>` |
| 5 | `    <th>COMMENT  </th>` |
| 6 | `  </tr>` |
| 7 | `  <tr>` |
| 8 | `    <td>A.A.Alp  </td>`<br>`    <td>image </td>`<br>`    <td>FIRST </td>` |
| 9 | `  </tr>` |
| 10 | `  <tr>` |
| 11 | `    <td>B.B.Bet  <p> BETA <p> €200   </td>` |
| 12 | `    <td>image </td>` |
| 13 | `    <td>SECOND  </td>` |
| 14 | `  </tr>` |
| 15 | `  <tr>` |
| 16 | `    <td>G.G.GAM</td>` |
| 17 | `    <td>image </td>` |
| 18 | `    <td>THIRD  </td>` |
| 20 | `  </tr>` |
| 21 | `</table>` |

PAGE   240

FIG. 14

| AUTHOR | IMAGE | COMMENT |
|---|---|---|
| A. A. Alp | α | FIRST |
| B. B. Bet<br>BETA<br>€ 200 | β | SECOND |
| G. G. Gam | γ | THIRD |

PRESENTATION  260

FIG. 15

METHOD, SYSTEM AND PROGRAM FOR PROVIDING PAGE WITH PLURALITY OF CODE PORTIONS IN BROWSER MARKUP LANGUAGE

FIELD OF THE INVENTION

The present invention generally relates to data processing and, more particularly, relates to computer methods, systems, and programs that are used in Internet communication where a server provides a web page in markup language and a client presents this page.

BACKGROUND OF THE INVENTION

Client and server computers often communicate over networks such as the Internet or over a company intranet. The client sends a request to the server; and the server generates a web page by accessing a data interface (i.e. data base) for data items (e.g., author, title, price information) The page generator in the server computer is often referred to as "renderer"; the page uses a markup language format such as HTML. In the client computer, a browser interprets the page and provides a presentation to a screen. The presentations often use tables with the table elements row, column and cell. Often, the page generator adds predefined further data items, such as predetermined text portions (e.g. currency symbols). Simply, in case of one-to-one assignment from item to cell, one table cell shows one data item. More complex, one table cell shows multiple data items.

It is desired to define the arrangement of data items in the table as free as possible and to customize an existing table. For example, an existing table writes data items in horizontally arranged cells, and a modified table writes the same data items in vertically arranged cells.

However, for defining and customizing the table, technical problems have co be solved. The modified table requires a modified page. Hence the page generator needs to generate a different page code. Since the page generator is a compiled computer program, the page generator has to be modified at least partially in source code and has to be re-compiled.

Further problems are raised because the person who redesigns the page generator needs knowledge in computer programming (e.g., source code of page generator, infrastructure of compiler). There is an ongoing need for a technical solution that alleviates these problems.

SUMMARY OF THE INVENTION

The present invention relates to a method for providing a page with a plurality of code portions in a browser markup language. The method comprises the following steps: (i) reading a first plurality of data items from a data interface; (ii) reading a description in a descriptive markup language that has code portions to describe a table structure, a plurality of references to the data items in the first plurality, a second plurality of data items, and a presentation direction by that data items of the first and second pluralities are to be consecutively presented by the browser; and (iii) providing code portions for the page in the browser markup language as follows: according no the table structure, writing corresponding structure-code-portions to the page; between the structure code portions, writing data code portions corresponding to the data items in the first plurality (by resolving the references) and corresponding to the data items in the second plurality; and between the data code portions, writing presentation direction code portions.

Preferably, the description describes the table structure as a plurality of cells in a row. Preferably, the browser markup language is HTML and wherein the descriptive markup language is XML.

The present invention also relates to a computer system with a server computer and a client computer, wherein the server computer has a generator to provide a page with a plurality of code portions in a browser markup language, and wherein the client computer has a browser to interpret the page, wherein the generator has a first input coupled to a data interface with first data items, has a second input coupled to a description in a descriptive markup language, and has an output for providing code portions for the page in the browser markup language; the system characterized by the following features of the generator and of the description:

The description has code portions to describe a table structure, has a plurality of references to the first data items, has second data items, and has code portions to determine a presentation direction by that first and second data items are to be consecutively presented by the browser;

The generator provides the code portions as follows: the generator writes corresponding structure code portions to the page according to the table structure, the generator writes data code portions corresponding to the first and second data items between the structure code portions, and the generator writes presentation direction code portions between the data code portions.

The present invention also relates to a computer program product embodied on a carrier, the computer program product having processor instructions that cause a computer processor to provide a page with a plurality of code portions in a browser markup language, the processor instructions comprise: instructions for reading a first plurality of data items from a data interface; instructions for reading a description in a descriptive markup language that has code portions to describe a table structure, a plurality of references to the data items in the first plurality, a second plurality of data items, and code portions to describe a presentation direction by that data items of the first and second pluralities are to be consecutively presented by the browser; instructions for providing code portions for the page in the browser markup language as follows: according to the table structure, writing corresponding structure code portions to the page, between the structure code portions, writing data code portions corresponding to the data items in the first plurality—by resolving the references—and corresponding to the data items in the second plurality, and between the data code portions, writing presentation direction code portions.

Having the description separated from the data interface has a variety of advantages. Describing the properties of the presentation to the description is independent from providing the code for the page. There is no longer the need to recompile the page generator every time the presentation has to be modified. Also, pluralities of code in the description define single tables. Multiple pluralities of code independently describe multiple tables. In other words, a page can have one or more tables each being defined differently.

The designer does not need to have programming skills at the level of page generator source code or compiling infrastructure. It is sufficient to have skills in the code of the description.

Method, system and computer program product of the present invention are technical. The provided code portions of the page are transferred to the browser as signals (i.e. as technical means). Any mentioning of page content (e.g., "ALPHA") is exemplary content to conveniently explain the invention. The presentation direction is also a technical term:

the direction indicates how browser and client computer generate control signals for a screen to physically display items, for example, horizontally or vertically to each other.

BRIEF DESCRIPTION OF THE DRAWINGS

FIG. 6 illustrates the content of an exemplary data interface;

FIGS. 7-9 illustrate an example for a description, a page, and a table presentation for a first exemplary embodiment;

FIGS. 10-12 illustrate an example for a description, a page, and a table presentation for a second exemplary embodiment; and FIGS. 13-15 illustrate an example for a description, a page, and a table presentation for a third exemplary embodiment.

DETAILED DESCRIPTION OF THE INVENTION

Figure 1:
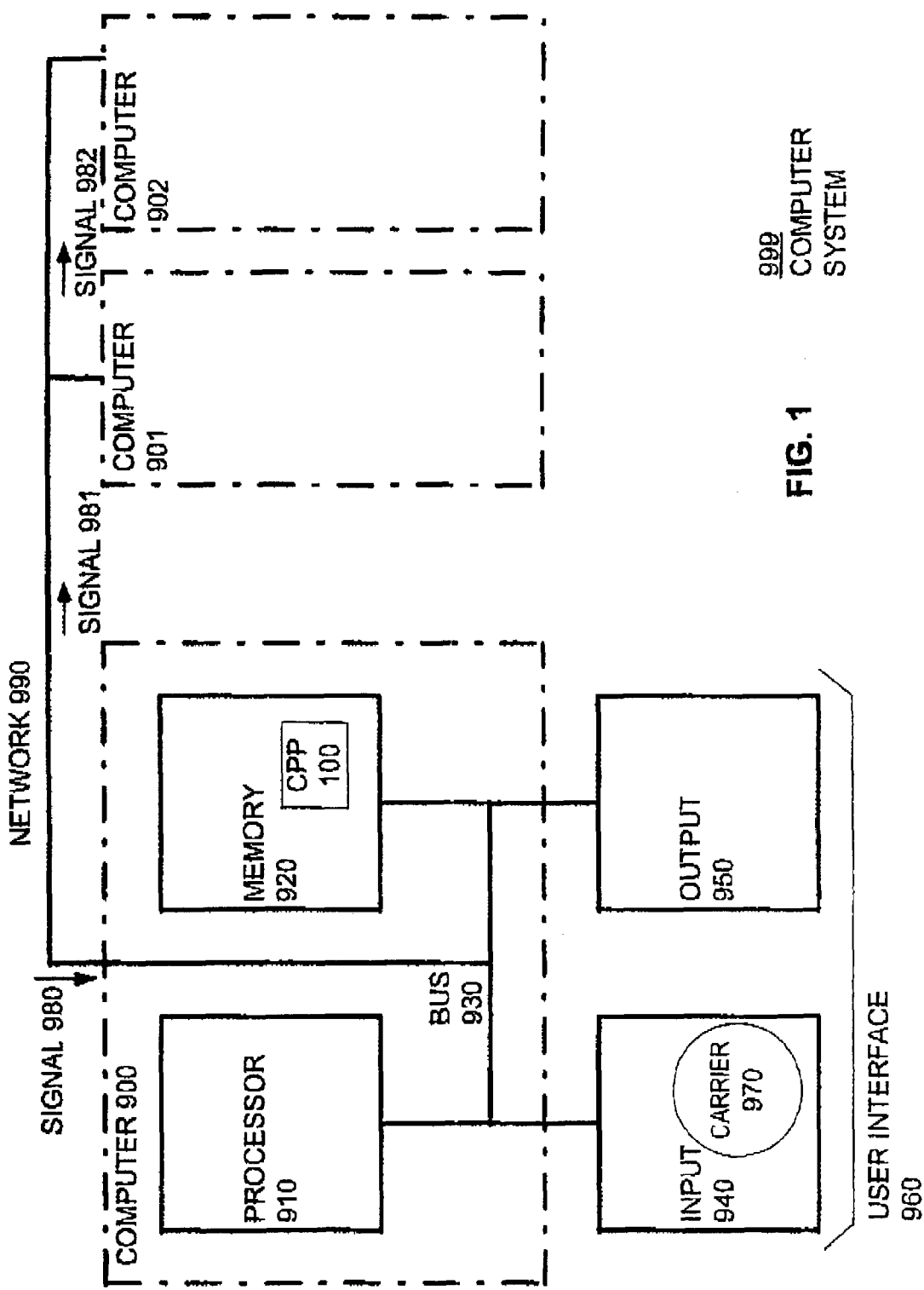
FIG. 1 illustrates a simplified diagram of a computer system.

FIG. 1 illustrates a simplified block diagram of computer network system 999 having a plurality of computers 900, 901, 902 (or 90$q$, with q=0, ... Q-1, Q any number).

Computers 900-902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$, and 91$q$-98$q$, (shown for q=0) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 (e.g., cache, register), or elsewhere. Memory 920 can be a read only memory (ROM), a random access memory (RAM), or a memory with other access options. Memory 920 is physically implemented by computer-readable media, such as, for example; (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner, or disc drive. Although the examples are devices with human interaction, device 940 can also operate without human interaction, such as, a wireless receiver (eg., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the Internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URL), hyper text markup language HTML, extensible markup language (XML), extensible hyper text markup language (XHTML), wireless application markup language (WML), standard Generalized Markup Language (SGML) etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2:
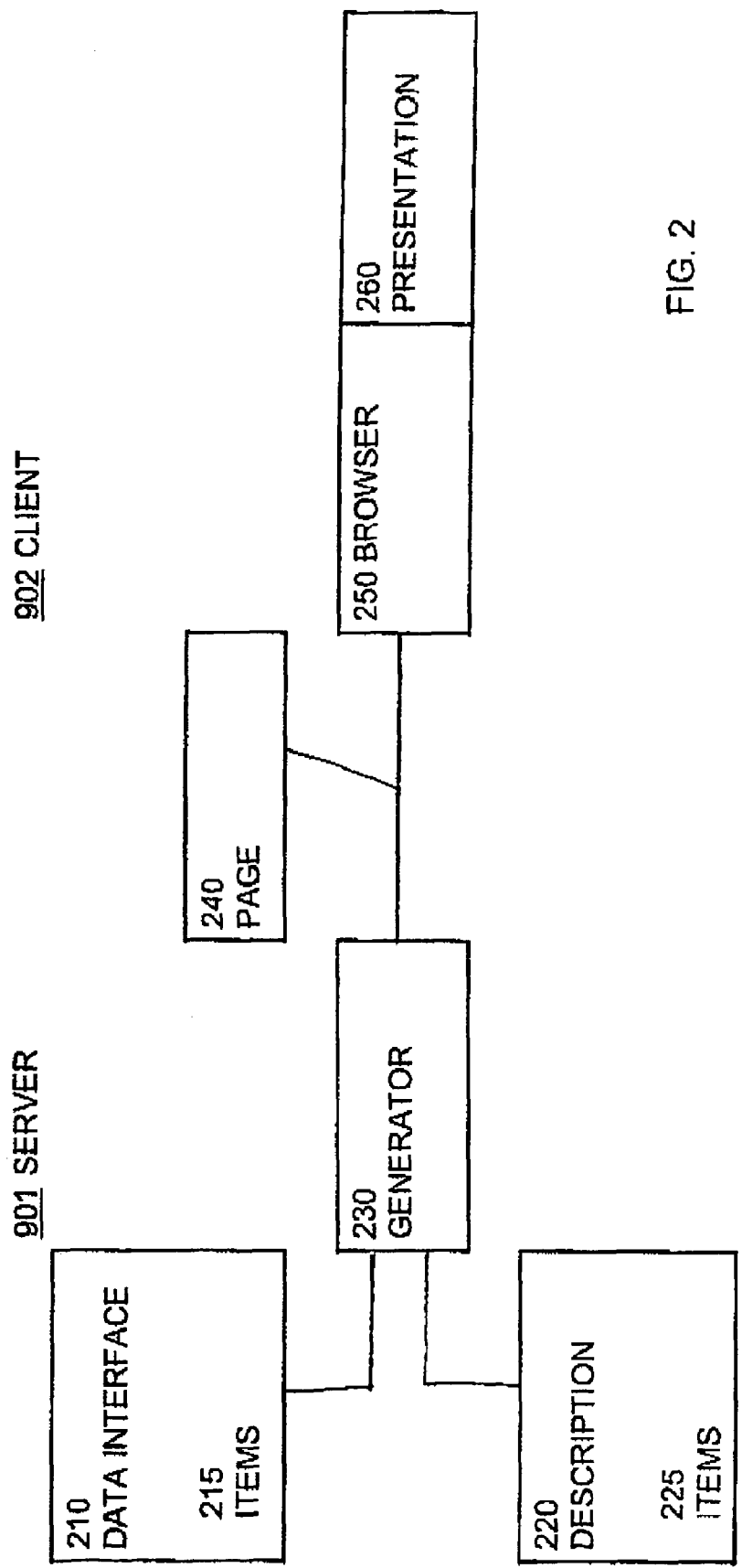
FIG. 2 illustrates an overview about software components used by the present invention.

FIG. 2 illustrates an overview about components used by the present invention. At server computer 901, the software components used by the present invention are: data interface 210, page generator 230 (renderer), description 220, and page 240. Client computer 902 has browser 250 that interprets page 240 to provide presentation 260 on a computer screen (e.g., on screen 952 described in connection with FIG. 1). Preferably, presentation 260 is a table or an arrangement of tables.

Data interface 210 provides a first plurality of data items 215 to be presented ("first items 215"), details are explained in Connection with FIG. 6. Description 220 describes page 240 by a plurality of code portions in a descriptive markup language (e.g., XML). Details are explained in connections with FIGS. 7, 10 and 13 where The portions are numbered X01 to X99 ("X-code"). The X-code portions describe a table structure for presentation 260, a plurality of references (FIELDREF) to data items 215 (first plurality), a second plurality of data items 225 ("second items", TEXT), and a presentation direction (FLOWLAYOUT) by that data items 215, 225 (of both pluralities) are to be consecutively presented (by browser 250).

Generator 230 reads the first plurality of data items 215 from data interface 210, reads description 220 and provides code portions for page 240 (Y01-Y99, "Y-code", FIGS. 8, 11, 14) according to a method of the present invention as described in the following. Generator 230 provides page 240 in a browser markup language, i.e. in a language that can be interpreted by browser 250. The language of the Y-code is, for example HTML, DHTML, or WML. The explanation conveniently uses HTML.

It is convenient to introduce time periods; T0 is the design time of description 220, T1 is the operation time of generator 230, and T2 is the operation time of browser 250.

Figure 4:
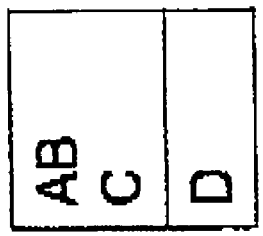
FIGS. 3-4 illustrate table presentations on a screen in vertical and horizontal directions.
Figure 3:
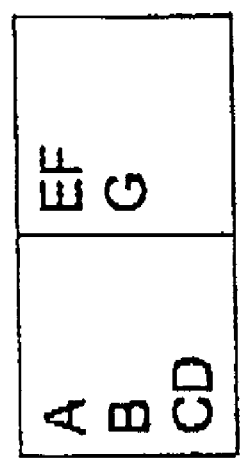

FIG. 3-4 illustrates table presentations on a screen in vertical and horizontal directions. The X-code portions in description 220 define a presentation direction by that data items (215, 225 cf. FIG. 2) are consecutively presented by browser 250. The exemplary data items in FIGS. 3-4 are items "A" to "G". Distinction between first plurality (from interface 210) and second plurality (from description 220) is not required, Table structures are rows, columns or cells.

FIG. 3 illustrates a table row having a first cell with items "A", "B", "C" and "D" and a neighboring second cell with items "E", "F", and "G". Predefined direction X-code in description 220 causes generator 230 to write Y-code such that browser 250 starts the first cell with "A", changes to vertical direction, continues with "B" on a new line, keeps the direction with "C", and changes to horizontal direction and continues with "D" without going to a new line. In the second cell, items "E", and "F" are unidirectional presented in the first line, and item "G" is presented in the second line.

FIG. 4 illustrates a table column with a first cell with items "A", "B", and "C" and a second cell with item "D". Predefined direction X-code in description 220 causes generator 230 to write Y-code such that browser 250 starts the first cell with "A", continues the first cell with "B" in horizontal direction, changes the direction in the first cell by 90, degree, writes "C" below, and starts the second cell with "D".

As used in the examples (FIGS. 7, 10, 13) for description 220, direction X-code uses terms like "FLOWLAYOUT" in combination with "V" for vertical and "H" for horizontal. As in the example for page 240, corresponding Y-code uses tags like "<p>" and <td>.

Figure 5:
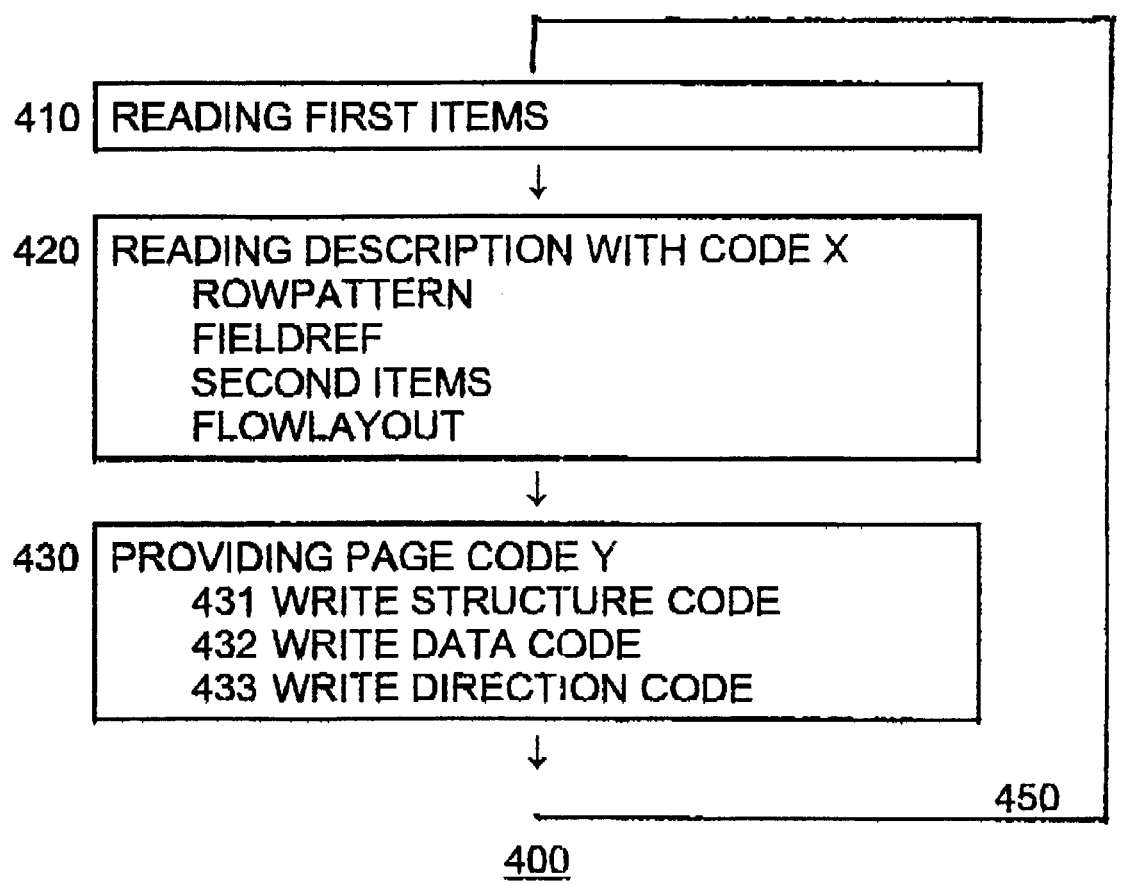
FIG. 5 illustrates a flow chart diagram of a method of the present invention.

FIG. 5 illustrates a flow chart diagram of a method of the present invention. Method 400 for providing page 240 with a plurality of Y-code portions (i.e. in a browser markup language such as HTML) comprises the following steps: reading 410 a first plurality of data items, reading 420 a description in a descriptive language, and providing 430 code portions for page 240.

Method 400 is executed by a computer processor, preferably, by the processor of server computer 901. Persons of skill in the art are able to provide a method-corresponding computer program product (CPP) with instructions for each method step. In terms of the foregoing description, CPP and processor form generator 230.

In step reading 410, generator 230 reads first data items 215 (i.e. plurality of items) from data interface 210. For example, generator 230 reads data items 215 such as "A. A. Alp, ALPHA . . . FIRST" of the first set.

In step reading 420, generator 230 reads description 220 in a descriptive markup language (e.g., XML) that has code portions X to describe the following:

a table structure (e.g., ROWPATTERN in X02, X16 of FIG. 7), a plurality of references to first data items 215 (e.g., references FIELDREF in X04, X06, X07, X10, X12 of FIG. 7), second data items 225 (e.g., TEXT in X09 of FIG. 7), and a presentation direction by that data items 215, 225 (both pluralities) are to be consecutively presented by browser 250.

The presentation direction is indicated, for example, by the code-word FLOWLAYOUT in X03, X05, X08, X11, X13 of FIG. 7). Preferred directions are horizontal direction and vertical direction. In other words, directions are defined to be perpendicular to each other.

In step providing 430, generator 230 provides code portions Y for page 240 in the browser markup language (e.g., HTML). Conveniently, step 430 comprises writing steps 431, 432, and 433, for different code portions: structure code, data code, and presentation direction code, respectively.

According to the table structure (i.e. ROWPATTERN), writing 431 corresponding structure code portions (e.g., Y02, Y08 in FIG. 8) to page 240.

Between the structure code portions, writing 432 data code portions (e.g., Y04, Y05, Y06, Y07 in FIG. 8) corresponding to first data items 215 and corresponding to second data items (eg., X09 "ε"). For first data items 215, generator 230 resolves references, such as X04 for "image", X06 for "A. A. Alp", X07 for "ALPHA", X10 for "100", and X12 for "ALPHA A. A.".

Between the data code portions, writing 433 presentation direction code portions (e.g., Y04, Y05, Y06 <p> for a new line).

As indicated by repetition line 450, steps 410-430 are repeated for further data sets.

The following figures explain details by an example scenario in that screen presentations refer to books. Persons of skill in the art can use other scenarios without departing from the scope of the present invention.

FIG. 6 illustrates a exemplary content of data interface 210. Interface 210 is the coupling point to any data source, such as to a database. As mentioned above, interface provides a first plurality of data items 215. Conveniently, first items 215 are arranged in data fields 216, having field names such as AUTHOR_field, TITLE_field, PRICE_field, IMAGE_field, COMMENT_field. A data set is a plurality of data items 215 that comprises data from each field 216.

Data items 215 are given for books, among them the items of the first set comprising imaginary book "ALPHA" by imaginary author "A. A. Alp" having a price of "100", a Greek letter image (like the title) and some comments. Imaginary books BETA and GAMMA form second and third sets, respectively.

For referring co data items 215 (of first plurality), the X-code in description 220 uses terms like "FIELDREF" in combination with the field names.

To enhance the presentation, generator 230 also provides X-code to present the second plurality of data items 225. Since some of these data items 225 (second plurality) are useful for column headlines, they are named conveniently similar to the field names in interface 210: AUTHOR, TITLE, PRICE, IMAGE and COMMENT. A further data item 225 (of second plurality) is the auxiliary text "ε" with a currency symbol. Storing these second items 225 in description 220 is convenient.

FIGS. 7, 10, and 13 illustrate code portions of description 220; FIGS. 8, 11 and 14 illustrate code portions of page 240; FIGS. 9, 12 and 15 indicate the corresponding presentations 260 by browser 250.

FIGS. 7-8, 10-11, and 13-14 conveniently number code portions for each line by X or Y with two digits left of vertical lines. Separating the portions into lines is convenient for explanation but not necessary. The code portions are simplified. Left out are:

numerical values to indicate the size of a table (e.g., pixels),
color code,
other style information,
headline code such as "BOOK LIST",
space symbols, etc., In the Y-code of FIGS. 9, 12 and 15, code to display an image is simplified to the terms "image". Persons of skill in the art can replace this by calls to images files (e.g., img src="alpha_image.gif"). Also, in X-code and in Y-code, attributes to identify data items 215, 225 are illustrated by ellipsis, like an attribute data="book_data" used in the XML tag <TABLE>. Persons of skill in the art can add attributes, for example, to specify a particular data interface for a particular table.

Preferably, X-code and Y-code use opening (<) and closing tags (</). The functionality of the tags is well known and therefore not further explained. For example, the closing tags reset definitions of the corresponding opening tags.

For convenience, the presentations in FIGS. 9, 12 and 15 may use reference numbers in parenthesis relating to the code lines in the descriptions (FIGS. 7, 10, 13.) To indicate repetitions of method steps, some numbers have prime and double prime markers.

According to the present invention, table definitions are provided with increasing accuracy for rows, for columns, and for cells. The exemplary first, second and third embodiments refer to this.

FIGS. 7-9 illustrate an example for description 220, page 240, and table presentation 260 for a first exemplary embodiment. Description 220 defines a single row pattern (between X02 and X15). Generator 230 uses the pattern 3, times for 3, data sets to provide Y-code for a first row (Y02-Y08), for a second row (Y09-Y15) and for a third row (Y16-Y22). Method 400 reads on the first set (ALPHA) as follows:

In step reading 410, generator 230 reads first items 215 from data interface 210 that belong to the first set: "A. A. Alp", "ALPHA", "100", "image", and "FIRST".

In step reading 420, generator 230 reads description 220 with code portions X01-X16. The portions are:

X02, X16 with table structure ROWPATTERN that is applicable for a row;

X04, X06, X07, X10, X12 with references FIELDREF to first items 215, i.e., X06 referring via AUTHOR_field to "A. A. Alp" and so on until X12 referring via COMMENT_field to "FIRST";

X09 with item 225 TEXT="ε" of the second plurality (no need to store this common information in a database); and X03, X05, X08, X11, X13 with presentation direction FLOWLAYOUT by that data items 215, 225 (both pluralities) are to be consecutively presented by browser 250.

The order of steps reading 410 and reading 420 is not important for the present invention; optionally, reading 420 is performed prior to reading 410.

In step providing 430, generator 230 provides code portions Y01-Y09 of page 240 as follows:

According to the table structure ROWPATTERN, generator 230 writes 431 corresponding structure code portions Y02, Y08.

Between these portions Y02 and Y08, generator 230 writes 432 data code portions Y03, Y04, Y05, Y06, Y07 corresponding to data items 215, 225 (in the first and second pluralities). For Y03, generator 230 resolves reference X04 "image"; for Y04, generator 230 resolves reference X06 "A. A. Alp"; for Y05, generator 230 resolves X07 "ALPHA"; for Y06, generator 230 writes "ε" from X09

(second plurality) and resolves X10 "100"; and for Y07, generator resolves X12 "FIRST".

Between the data code portions Y04, Y05, Y06, Y07, generator 230 writes 433 presentation direction code portions <p> to Y04, Y05, and Y06.

Preferably, generator 230 parses description 220 for one X-code portion after another, and thereby provides page 240 by one Y-code portion after another.

In other words, generator 230 interprets description 220 as follows:

X01, writing Y01;
X02, setting a row pattern by writing <tr> to Y02;
X03, setting direction to horizontal direction, writing <td> to Y03;
X04, resolving IMAGE_field and writing "image" to Y03, writing </td>, keeping horizontal direction;
X05, setting vertical direction (for the next items), writing <td> to Y04;
X06, reading AUTHOR_field, writing "A. A. Alp" to Y04, writing <p> to Y04 to follow vertical direction;
X07, reading TITLE_field, writing "ALPHA" to Y05, writing <p> to Y05 to follow vertical direction;
X08, setting horizontal direction;
X09, writing "€" (without adding a <p> due to horizontal direction);
X10, reading PRICE_field, writing "100" (next to "€") to Y06;
X11, resetting the horizontal direction (to vertical direction), <p> to Y06;
X12, reading COMMENT_field, writing "FIRST" to Y07;
X13, resetting, writing </td> to Y07
X14, resetting, writing </tr> to Y08.

After having provided Y05, generator 230 repeats the method steps for second and third data sets (BETA, GAMMA, X-code-numbers with markers in FIG. 9). Since the same X-pattern is used (X02-X15), the presentation of the corresponding second and third rows are similar to the first row.

Per default, browser 250 reading code without <p> tags (or similar tags) arranges data items horizontally. It is an advantage of the present invention to overcome to define the H/V direction at a time point when page 240 has not yet been generated.

In the first exemplary embodiment, X-code was applicable for all rows, and some columns (right column) present multiple data items in each cell. Patterns can also be defined at a cell level:

FIGS. 10-12 illustrate an example for description 220, page 240, and table presentation 260 for a second exemplary embodiment. Presentation 260 in FIG. 12 shows head titles from AUTHOR to COMMENT The X-codes in FIG. 10 relate to the column AUTHOR (cf. X02). According to X05, X06, X07, X08, and X09 (cf. FIG. 10), generator 230 generates Y-code (e.g., in Y03 with <p>) that causes each cell in the AUTHOR-column to present:

AUTHOR (e.g., "A. A. Alp")
TITLE (e.g. "ALPHA")
Currency symbols with PRICE (e.g., "€ 100").

Other X-code (not shown) causes generator 230 to provide further Y-code for presenting TITLE (e.g., in Y04), PRICE (e.g., in Y05), IMAGE (e.g., in Y06) and COMMENT (e.g., in Y07).

To prevent redundancy without the need to delete X-code, optionally, further X-code is provided to declare some X-code invalid. It is therefore possible to remove selected columns or data items from the presentation.

It is also possible to declare some fields in interface 210 invisible (cf. description 220 in FIG. 10, X14 and X15.

Optionally, X-code is simplified. For example X02 <COLUMN name="AUTHOR"> and X03 <COLUMNPATTERN> can be combined to <COLUMNPATTERN name="AUTHOR">. In that case, COLUMNPATTERN identified the following X-code as applicable for a COLUMN; the attribute name="AUTHOR" limits the applicability of the pattern to column with the header AUTHOR.

FIGS. 13-15 illustrate an example for description 220, page 240, and table presentation 260 for a third exemplary embodiment. As in X02 and X13, X-code is dedicated to the second row in the column AUTHOR. The other cells in the table follow other X-code similar as explained above.

Similar as above explained (cf. FIG. 10), <CELL field ="AUTHOR" row="2"> and <CELLPATTERN> can be combined to <CELLPATTERN ="AUTHOR" row="2">.

The invention claimed is:

1. A computer-executable method for providing a page from a server to a client with a plurality of code portions in a browser markup language, the method comprising:
    providing a page generator at the server for performing the steps of:
    reading at the server a first plurality of data items from a data interface;
    reading at the server a description in a descriptive markup language that comprises code portions to describe:
    a table structure,
    a plurality of references to the data items in the first plurality of data items,
    a second plurality of data items, and
    a presentation direction according to which the data items of the first and second pluralities are to be consecutively presented by the browser;
    writing, by the server, code portions for the page in the browser markup language, wherein writing code portions for the page comprises:
    according to the table structure, writing corresponding structure code portions to the page,
    between the structure code portions, writing data code portions corresponding to the data items in the first plurality by resolving the references, and writing data code portions corresponding to the data items in the second plurality, and
    between the data code portions, writing presentation direction code portions; and
    providing the page from the server to the client, whereby the page can be modified by modifying the description without recompiling the page generator.

2. The method of claim 1, wherein the description describes the table structure as a plurality of cells in a row.

3. The method of claim 1, wherein the browser markup language comprises HTML and wherein the descriptive markup language comprises XML.

4. The method of claim 1, wherein the presentation direction code directions define at least one of a horizontal presentation direction and a vertical presentation direction.

5. A computer system comprising a server computer and a client computer, the server computer executing on a processor, and comprising a generator to provide a page with a plurality of code portions in a browser markup language, the client computer comprising a browser to interpret the page, and the generator comprising a first input coupled to a data interface with first data items, a second input coupled to a description in a descriptive markup language, and an output for providing code portions for the page in the browser markup language; wherein the computer system further comprises the following features related to the description and the generator:

the description comprises code portions to describe a table structure, a plurality of references to the first data items, second data items, and code portions to determine a presentation direction according to which the first and second data items are to be consecutively presented by the browser; and the generator provides the code portions by: writing corresponding structure code portions to the page according to the table structure, writing data code portions corresponding to the first and second data items between the structure code portions, writing presentation direction code portions between the data code portions, and providing the page to the client, whereby the page can be modified by modifying the description without recompiling the generator.

6. The computer system of claim 5, wherein the description describes the table structure as a plurality of cells in a row.

7. The computer system of claim 5, wherein the browser markup language comprises HTML and wherein the descriptive markup language comprises XML.

8. The computer system of claim 5, wherein the presentation direction code directions define at least one of a horizontal presentation direction and a vertical presentation direction.

9. A computer readable medium storing processor instructions that cause a computer processor to provide a page from a server to a client with a plurality of code portions in a browser markup language, the processor instructions comprising:

instruction for providing a page generator at the server for performing the steps of:

reading at the server a first plurality of data items from a data interface;

reading at the server a description in a descriptive markup language that comprises code portions to describe a table structure, a plurality of references to the data items in the first plurality of data items, a second plurality of data items, and code portions to describe a presentation direction according to which data items of the first and second pluralities are to be consecutively presented by the browser;

writing by the server code portions for the page in the browser markup language by:

writing corresponding structure code portions to the page according to the table structure, between the structure code portions, writing data code portions corresponding to the data items in the first plurality by resolving the references and writing data code portions corresponding to the data items in the second plurality, and between the data code portions, writing presentation direction code portions; and providing the page from the server to the client, whereby the page can be modified by modifying the description without recompiling the page generator.

10. The computer product of claim 9, wherein the description describes the table structure as a plurality of cells in a row.

11. The computer product of claim 9, wherein the browser markup language comprises HTML and wherein the descriptive markup language comprises XML.

12. The computer product of claim 9, wherein the presentation direction code directions define at least one of a horizontal presentation direction and a vertical presentation direction.

* * * * *

UNITED STATES PATENT AND TRADEMARK OFFICE
CERTIFICATE OF CORRECTION

| | | |
|---|---|---|
| PATENT NO. | : 7,669,118 B2 | Page 1 of 1 |
| APPLICATION NO. | : 10/337230 | |
| DATED | : February 23, 2010 | |
| INVENTOR(S) | : Kolb et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1327 days.

Signed and Sealed this

Seventh Day of December, 2010

David J. Kappos
*Director of the United States Patent and Trademark Office*